US008719265B1

(12) United States Patent
Bedrax-Weiss et al.

(10) Patent No.: US 8,719,265 B1
(45) Date of Patent: *May 6, 2014

(54) PRE-FETCHING INFORMATION IN ANTICIPATION OF A USER REQUEST

(75) Inventors: Tania Bedrax-Weiss, San Jose, CA (US); Bay-Wei Chang, Foster City, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,798

(22) Filed: Sep. 14, 2012

Related U.S. Application Data

(63) Continuation of application No. 11/267,578, filed on Nov. 7, 2005.

(51) Int. Cl.
*G06F 17/30* (2006.01)

(52) U.S. Cl.
CPC ................................. *G06F 17/30* (2013.01)
USPC .......................................................... 707/736

(58) Field of Classification Search
USPC .......................................................... 707/736
See application file for complete search history.

(56) References Cited

U.S. PATENT DOCUMENTS

| | | | |
|---|---|---|---|
| 6,772,408 B1 | 8/2004 | Velonis et al. | |
| 6,973,457 B1 | 12/2005 | Bastawala et al. | |
| 7,127,416 B1 | 10/2006 | Tenorio | |
| 2001/0053989 A1 | 12/2001 | Keller et al. | |
| 2002/0054090 A1 | 5/2002 | Silva et al. | |
| 2002/0165860 A1 | 11/2002 | Glover et al. | |
| 2002/0178007 A1 | 11/2002 | Slotznick et al. | |
| 2003/0188009 A1 | 10/2003 | Agarwalla et al. | |
| 2004/0143564 A1* | 7/2004 | Gross et al. | 707/1 |
| 2004/0216056 A1 | 10/2004 | Tootill | |
| 2005/0234929 A1 | 10/2005 | Ionescu et al. | |
| 2006/0059129 A1* | 3/2006 | Azuma et al. | 707/3 |

OTHER PUBLICATIONS

Lempel et al., "Predictive Caching and Prefetching of Query Results in Search Engines" 2003, p. 20—Section 1.2 "Caching and Prefetching of Search Results".*
Google Web Accelerator Basics, http://webaccelerator.google.com!support.html, print date Oct. 31, 2005, 6 pages.
Office Action issued in U.S. Appl. No. 13/250,966 on Dec. 15, 2011, 14 pages.
Office Action issued in U.S. Appl. No. 11/267,578 on May 14, 2008, 28 pages.
Office Action issued in U.S. Appl. No. 11/267,578 on Jan. 7, 2009, 27 pages.
Office Action issued in U.S. Appl. No. 11/267,578 on Jul. 22, 2009, 22 pages.
Office Action issued in U.S. Appl. No. 11/267,578 on Jan. 7, 2010, 24 pages.
Office Action issued in U.S. Appl. No. 11/267,578 on Feb. 13, 2014, 13 pages.

* cited by examiner

*Primary Examiner* — Amresh Singh
(74) *Attorney, Agent, or Firm* — Fish & Richardson P.C.

(57) ABSTRACT

A system may pre-fetch search result information in anticipation of a user request for the search result information. The system may receive a user search query and request initial search results from a server based on the search query. The system may receive the initial search results from the server and render the initial search results for display to the user. In anticipation of a user request for additional search results, the system may request additional search results from the server. The additional search results may then be pre-fetched for potential display to the user in response to a user request to render the additional search results.

20 Claims, 6 Drawing Sheets

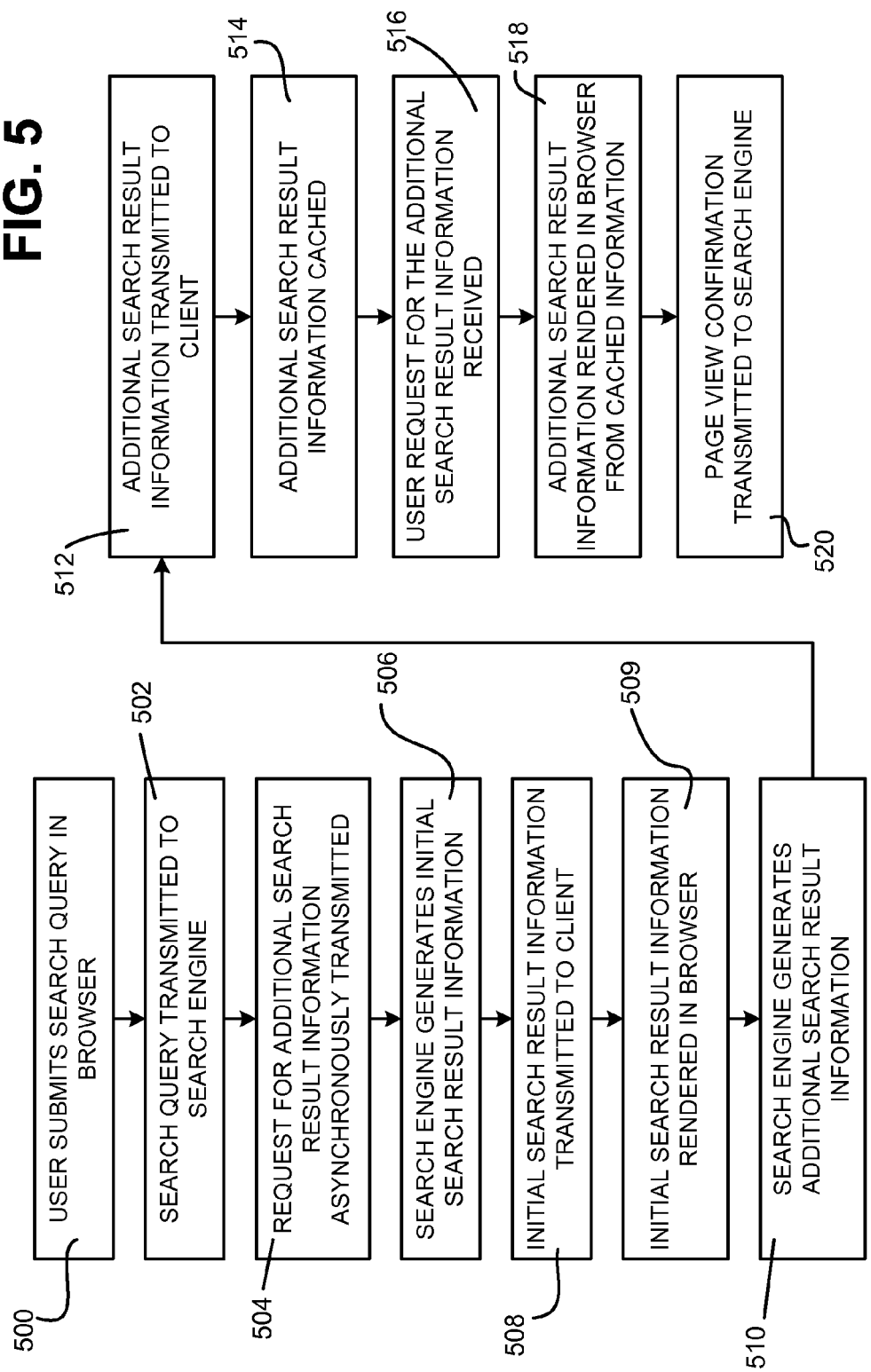

PRE-FETCHING INFORMATION IN ANTICIPATION OF A USER REQUEST

RELATED APPLICATION

This application is a continuation of U.S. patent application Ser. No. 11/267,578, filed Nov. 7, 2005, the entire disclosure of which is incorporated herein by reference.

FIELD OF THE INVENTION

Implementations consistent with the principles of the invention relate generally to information retrieval and, more particularly, to predictably retrieving information in anticipation of user requests for search results.

BACKGROUND

Existing information searching systems use search queries to search through aggregated data to retrieve specific information that corresponds to the received search queries. Such information searching systems may search information based locally or in distributed locations. The World Wide Web ("web") is one example of information in distributed locations. The web contains a vast amount of information, but locating a desired portion of that information can be challenging. This problem is compounded because the amount of information on the web, and the number of new users inexperienced at web searching, are growing rapidly. Search engines attempt to return hyperlinks to web documents in which a user is interested. Generally, search engines base their determination of the user's interest on search terms (e.g., in a search query provided by the user). The goal of the search engine is to provide links to high quality, relevant results to the user based on the search query. Typically, the search engine accomplishes this by matching the terms in the search query to a corpus of pre-stored web documents. Web documents that contain the user's search terms are considered "hits" and are returned to the user.

Search results provided to a user in response to a search query are typically ranked in some fashion to present the more useful, or relevant, documents higher in the list of search results, and to present the less useful, or relevant, documents lower in the list of search results. A predetermined number of the ranked search results are then typically returned to the user in the form of a web document.

SUMMARY

In accordance with one implementation consistent with the principles of the invention, a method may include receiving a search query; transmitting a first request to a server based on the search query; receiving initial search result information from the server based on the first request; rendering the initial search result information; automatically transmitting a second request to the server based on the search query without requiring input from the user; receiving additional search result information from the server based on the second request; and pre-fetching the additional search result information.

In another implementation consistent with the principles of the invention, a device includes logic to request initial search information from a server based on a user query, logic to render initial search information received from the server based on the initial search information request, logic to automatically request additional search information from the server; and logic for pre-fetching additional search information received from the sever prior to user sending a request for the additional search information.

In yet another implementation consistent with the principles of the invention, a method may include requesting first information from a server, receiving the first information from the server, rendering the first information for display to a user, requesting second information from the server in anticipation of a user request for the second information, wherein the requesting second information from the server is performed prior to receiving a user request for the second information, receiving the second information from the server, and storing the second information.

BRIEF DESCRIPTION OF THE DRAWINGS

The accompanying drawings, which are incorporated in and constitute a part of this specification, illustrate an implementation of the invention and, together with the description, explain the invention. In the drawings.

FIG. 5 is a flow chart of an exemplary process for pre-fetching search result information in an implementation consistent with the principles of the invention;

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Overview

Systems and methods consistent with the principles of the invention enhance a user's experience by improving response time in accessing and viewing results to a search query. When a search query is received, an initial results document may be rendered and transmitted to the user's device for display to the user. Additional search results documents may also be rendered and transmitted to the user's device in anticipation of a user's request for one or more of the additional search results documents, but prior to any actual request by the user.

Figure 1:
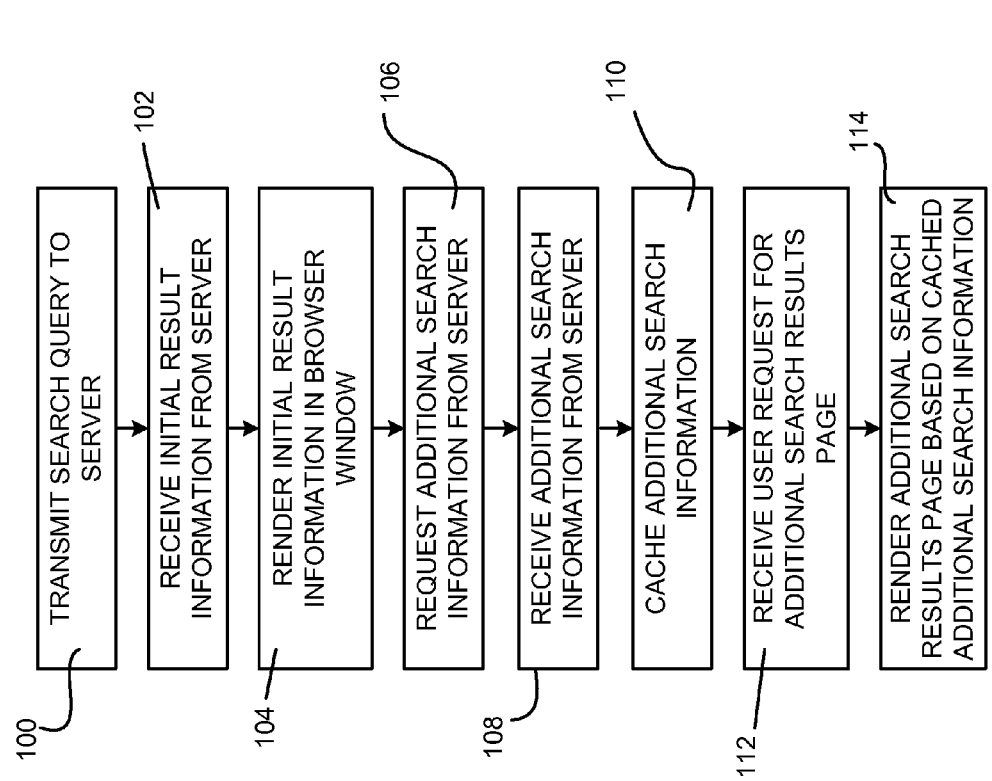
FIG. 1 is a flow chart of an exemplary process for expediting the display of a search result document to a user.

FIG. 1 is a flow chart of an exemplary process for expediting the display of a search result document to a user. Initially, processing may begin upon the transmission of a user search query to a server (act 100). As is known in the art, such a search query may be submitted via a web interface displayed in a browser software application residing on a user's client device. The search query may be transmitted via a computer network to one or more server device's operable to retrieve and render listings of search results in response to such queries. In response to receipt of the search query, initial search result information is compiled and received from the server (act 102). Typically, the initial search result information may then be rendered for display to the user in a browser window (act 104).

Next, in anticipation of a user's request for an additional search results page, but prior to any actual request, at least one additional search results page is requested from the server (act 106). Additional search result information related to the at least one additional search results page is then compiled and received from the server (act 108). This additional search result information is then stored or cached for use in responding to a user request for the additional search results page (act 110). Next, in response to the user request for the additional search results page (act 112), the additional search results page stored at act 110 is rendered for display to the user (act 114).

By anticipating and storing an additional search results page in advance of a user's request for the additional search page, implementations consistent with principles of the invention may improve search results response times and enhance overall user experience and satisfaction. Additional details regarding the implementation and modifications of this exemplary process are set forth in detail below.

A "document," as the term is used herein, is to be broadly interpreted to include any machine-readable and machine-storable work product. A document may include, for example, an e-mail, a web page, a file, a combination of files, one or more files with embedded links to other files, a news group posting, a blog or blog post, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
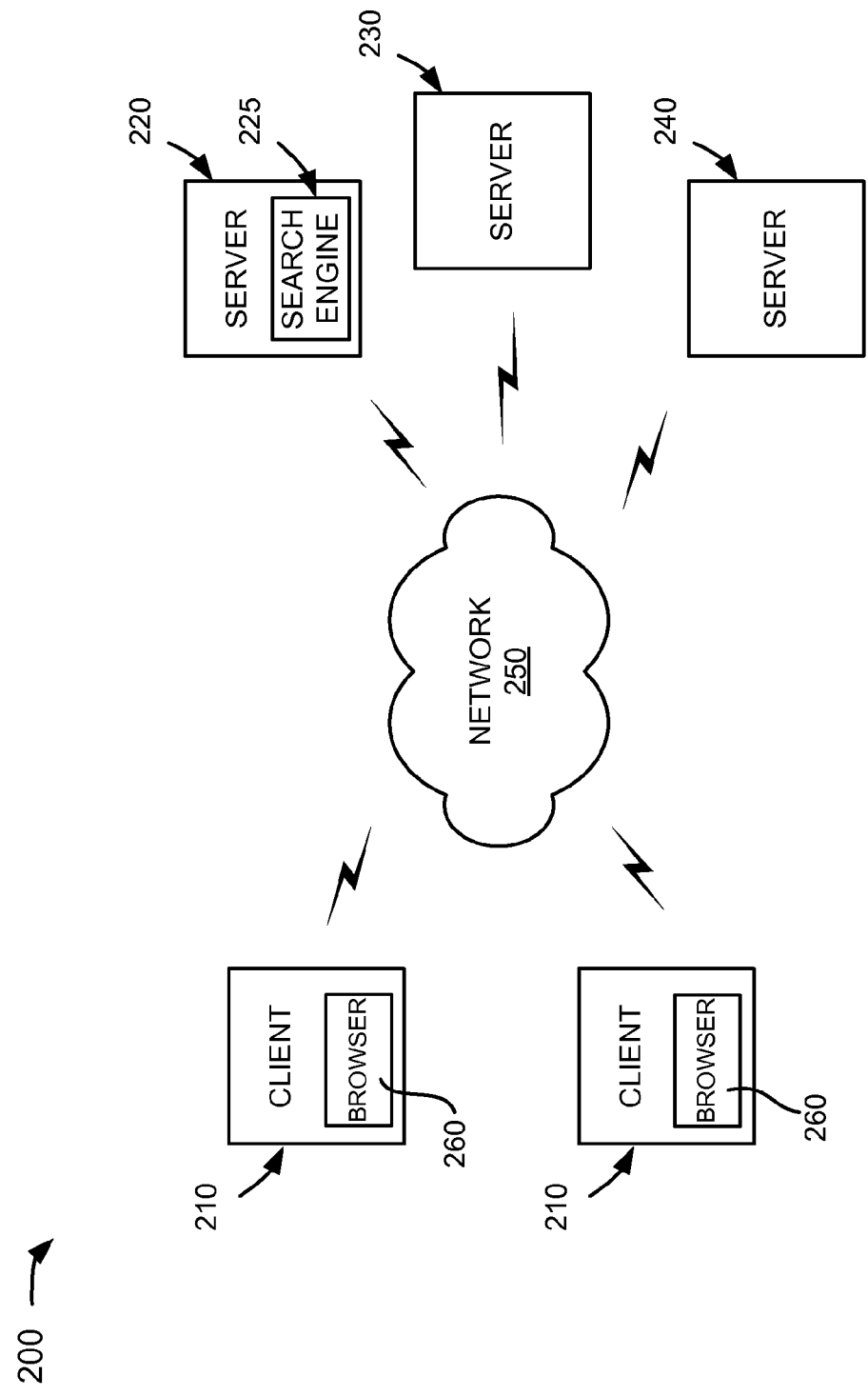
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a laptop, or another type of computation or communication device, a thread or process running on one of these devices, and/or an object executable by one of these devices. Clients 210 may further include browser software 260 configured to operate as a user interface between clients 210 and servers 220-240.

Servers 220-240 may include server entities that gather, process, search, and/or maintain documents in a manner consistent with the principles of the invention. In an implementation consistent with the principles of the invention, server 220 may include a search engine 225 usable by clients 210. Server 220 may crawl a corpus of documents, index the documents, and store information associated with the documents in a repository of documents. Servers 230 and 240 may store or maintain documents that may be crawled or analyzed by server 220. Additionally, servers 220-240 may also log or otherwise document the transmission of documents or information to clients 210.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
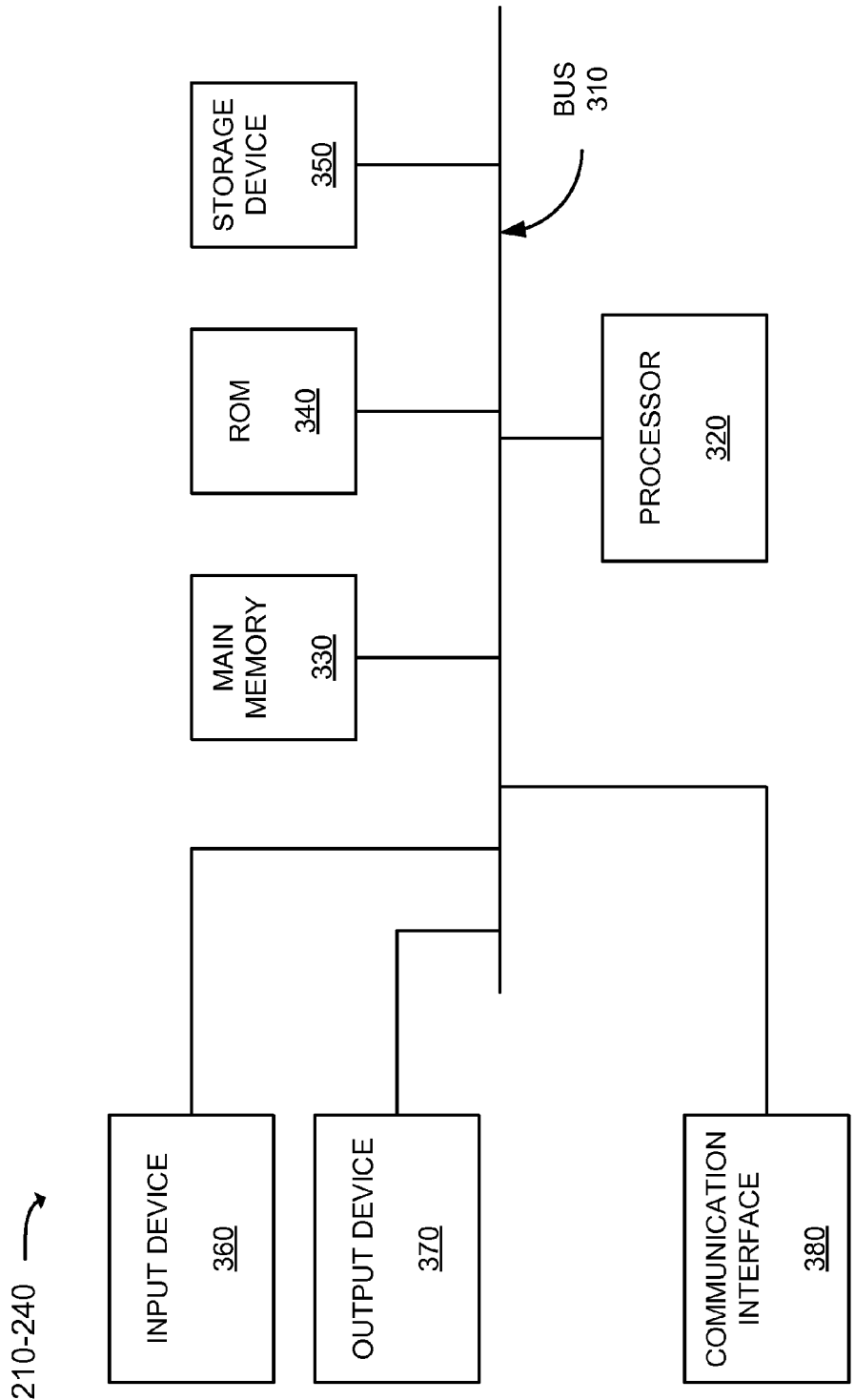
FIG. 3 is an exemplary diagram of a client or server entity in an implementation consistent with the principles of the invention.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 4:
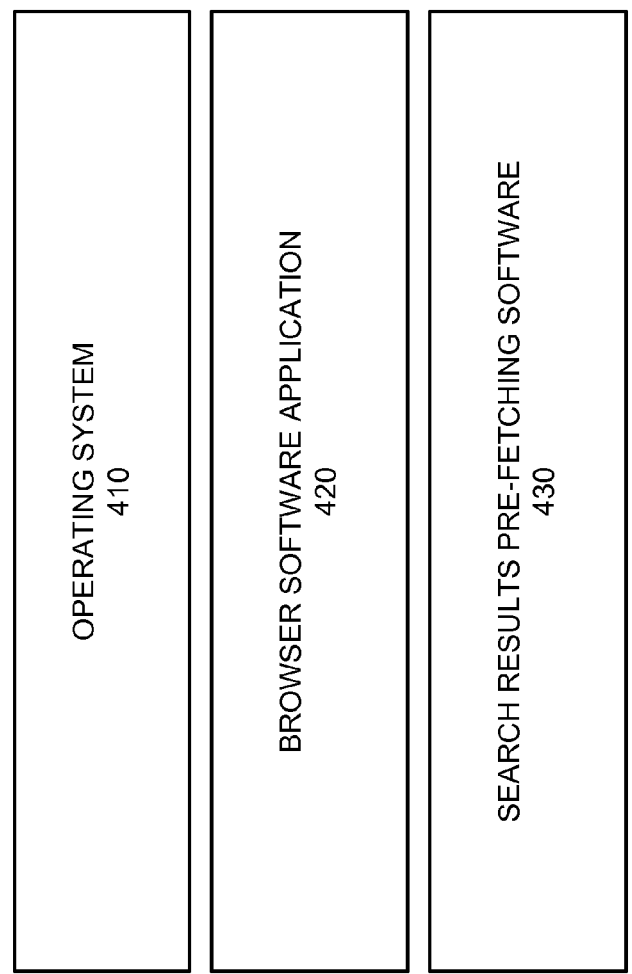
FIG. 4 is a diagram of a portion of an exemplary computer-readable medium that may be used by the client of FIG. 2.

FIG. 4 is a diagram of a portion of an exemplary computer-readable medium 400 that may be used by clients 210 or servers 220-240. In one implementation, computer-readable medium 400 may correspond to memory 330 of client 210. The portion of computer-readable medium 400 illustrated in FIG. 4 may include an operating system 410, browser software application 420, and search results pre-fetching software 430.

Operating system 410 may include operating system software, such as the Windows, Unix, or Linux operating systems. Browser software application 420 may provide a mechanism for exchanging information and requests for information or actions between client 210 and one or more servers 220-240. Moreover, browser software application 420 may be further operable to display information received from servers 220-240. Search results pre-fetching software 430 may include software that anticipates a user request for additional search results and retrieves associated search results for subsequent display upon receipt of a user request. In one implementation consistent with principles of the invention, search results pre-fetching software 430 may be integrated into browser software application 420.

In another implementation consistent with principles of the invention, search results pre-fetching software 430 may be included within browser assistant software operating in conjunction with browser software application 420. For example, browser assistant software may include a plug-in, an applet, a dynamic link library (DLL), or a similar executable object or process. Client 210 may obtain the plug-in from the server 220 or from a third party, such as a third party server, disk, tape, network, CD-ROM, etc. Alternatively, the plug-in may be pre-installed on the client 210.

The browser assistant software may be automatically activated upon initiation of the browser software application 420. Alternatively, the browser assistant software may be activated when instructed by a user. In either case, the browser assistant software may take the form of a graphical user interface, such as a tool bar, software button, or menu, that provides an extension to the browser software application 420.

In yet another implementation, search results pre-fetching software 430 may be resident on a web document transmitted from one of servers 220-240 to client 210 as executed by browser software application 420. For example, such search results pre-fetching software 430 may include JavaScript embedded within an HTML web page. As is known, JavaScript may include software instructions embedded within traditional hyper-text markup language (HTML) web documents that enable the execution of additional operations by browser software application 420. For example, JavaScript included within a web page may enable one or more pre-defined events to occur in response to user interaction with the page. Typically, these events are not possible using solely traditional HTML documents.

Exemplary Processing for Pre-Fetching Search Result Information

FIG. 5 is a flow chart of an exemplary process for pre-fetching search result information in an implementation consistent with the principles of the invention. Processing may begin with a user submitting a search query via, for example, browser software application 420 (act 500). In one implementation, the search query may include any suitable term, combination of terms, or phrases. A phrase may be defined as a collection of two or more words (e.g., vacations in Hawaii) or a quoted phrase (i.e., two or more terms that are treated as a single unit (e.g., "vacations in Hawaii")). Once received by browser software application 420, client 210 may submit or otherwise transmit the search query to search engine 225 residing on server 220 (act 502).

In one implementation consistent with principles of the invention, search results pre-fetching software 430 may asynchronously submit or otherwise transmit one or more requests for additional search result information to search engine 225 (act 504). For example, depending on user preferences or search engine defaults, the initial user search request may result in a return of 10 "hits" or documents relating to the received search query. Of course, it should be understood that the number of returned search results is arbitrary and may include any suitable number of hits. Consistent with principles of the invention, the pre-fetching software 430 may request information regarding any suitable number of additional documents relating to the search query. As will be described in additional detail below, search results pre-fetching software 430 may request the additional search result information in response to the observation of a triggering occurrence or other predefined event. Alternatively, the request for additional search result information may be performed automatically upon receipt of the search query or following a predetermined period of time.

In response to the initial request, search engine 225 may generate a document that contains the initially requested search results (act 506) and may transmit the initial search results document to browser software application 420 (act 508) for rendering in browser software application 420 (act 509). In an implementation consistent with the present invention, the search engine 225 may provide the search results as a HTML document, similar to search results provided by conventional search engines. Alternatively, the search engine 225 may provide the search results according to a protocol agreed upon by the search engine 225 and the browser software application 420.

In addition to the initial search results page, search engine 225 may also generate one or more documents that contain the additional search results requested by pre-fetching software application 430 (act 510). Consistent with principles of the invention, the additional search result document(s) may be transmitted to client 210 (act 512) and maintained in a browser cache maintained in memory 330 or disk storage 350 for subsequent use (act 514).

In an implementation consistent with the principles of the invention, the search results include links to documents (e.g., web pages) and possibly a textual description of the links. In another implementation, the search results include links to directory nodes within a hierarchical directory and possibly textual descriptions for the directory nodes. In other implementations, the search results include a combination of these links and/or other types of information.

Once stored in cache of client 210, subsequent user requests for the additional search result document(s) by browser software application 420 (e.g., by pressing on a "next", ">", "more results", or listed results page number) (act 516) may result in the retrieval and display of the additional search result data from the cache of client 210, rather than from search engine 225 on server 220 (act 518). In this manner, the rendering of the additional search result document(s) in browser software application 420 is provided in an expedited manner, thereby improving the user experience.

Consistent with principles of the invention, upon display of the additional search result document(s), a page view confirmation may be transmitted to search engine 225, informing search engine 225 that the pre-fetched search result document was actually rendered in browser software application 420 (act 520). This information may be useful in tracking performance of the search results as well as monitoring views of advertisements or other ancillary information included with the additional search results document. In accordance with one implementation consistent with principles of the invention, advertisements included within the additional search results document are not considered "served" to the user until such a page view confirmation is received by search engine 225.

Although the above description uses "initial" and "additional" nomenclature to describe search result documents retrieved and displayed directly from search engine 225 and pre-fetched data stored on client 210, respectively, it should be noted that once the initial search results page has been retrieved and displayed directly from search engine 225, any subsequent page views may be based on pre-fetched data. That is, upon display of a first pre-fetched "additional" search results page, subsequent asynchronous calls for additional search result data (beyond that already pre-fetched) may be requested from search engine 225. In this case, the first additional search result page may be considered to be the initial search results page in the above description.

Figure 6:
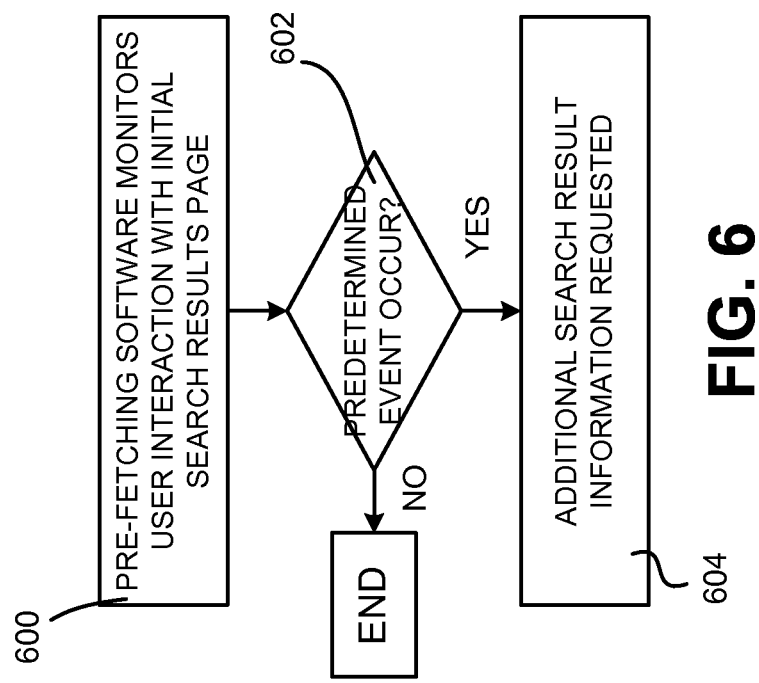
FIG. 6 is a flow chart of one exemplary process for determining whether the request for additional search result information should be made.

FIG. 6 is a flow chart of one exemplary process for determining whether the request for additional search result data (act 504) should be performed. Initially, search results pre-fetching software may monitor a user interaction with the initial search results page received and displayed at steps 508 and 509 of FIG. 5, respectively (act 600). It may then be determined whether a predetermined event or events (e.g., JavaScript events) have been observed or performed on the initial search results document (act 602). In one exemplary embodiment, a monitored event may include scroll bar movement. That is, scroll bar movement on the initial search results page may indicate that the user is dissatisfied with the result data included on the initial search results page and may request additional search result data. Another exemplary event may include user mouse over of a particular portion of the initial search page. In response to this indication, the asynchronous request for the additional search result data may be performed (act 604).

Figure 7:
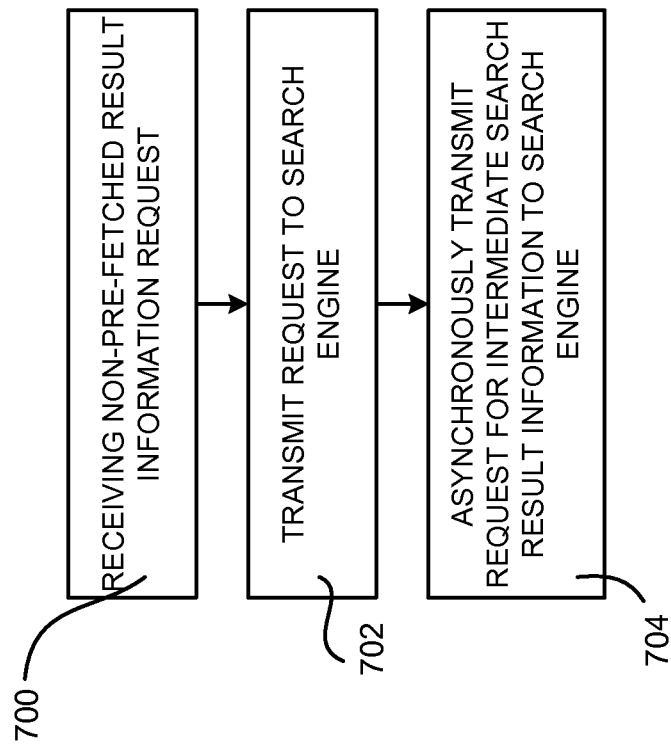
FIG. 7 is a flow chart of additional processing for pre-fetching search result information consistent with principles of the invention.

FIG. 7 is a flow chart of additional processing for pre-fetching search result information following the execution of act 514 of FIG. 5. Processing may begin with browser software application 420 receiving a user request for search results data that has not yet been pre-fetched (e.g., a user selection of search results page number beyond those that have been pre-fetched) (act 700). The specific request is transmitted to search engine 225 in a conventional manner (act 702).

In addition, search results pre-fetching software 430 may asynchronously submit or otherwise transmit one or more requests for additional search result information to search engine 225 (act 704). In one exemplary implementation consistent with principles of the invention, such requests for additional information may include requests for all search result data falling between the last pre-fetched data and the currently requested data. In addition, the request for additional information may also include requests for data associated with one or more additional search result pages beyond the currently requested page. In this manner, subsequent user requests for intermediate search result data or immediately subsequent search result data may be expeditiously provided.

CONCLUSION

Implementations consistent with the principles of the invention may use search result information pre-fetching to improve a user search experience.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 1 and 5-7, the order of the acts may be modified in other implementations consistent with the principles of the invention. Further, non-dependent acts may be performed in parallel.

The preceding description refers to a user. A "user" is intended to refer to a client, such as a client 210 (FIG. 2), or an operator of a client.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   receiving, by a client device and from a search engine, a first search results page including a first set of search results;
   after receiving the first search results page by the client device and before receiving an indication of a request from a user to display a second set of search results, providing, by the client device, the first search results page for display;
   after providing the first search results page for display, requesting, by the client device, a second search results page including the second set of search results;
   after requesting the second search results page including the second set of search results, receiving, by the client device, the second search results page;
   pre-caching the received second search results page on the client device; and
   after receiving the indication of the request, from the user, to display the second set of search results:
      obtaining the pre-cached second search results page;
      providing the obtained pre-cached second search result page for display; and
      before receiving an indication of a request, from the user, to display a third set of search results, and in response to providing the obtained pre-cached second search result page for display, transmitting, by the client device, a confirmation, to the search engine, that the obtained pre-cached second search results page was displayed.

2. The method of claim 1, further comprising:
detecting an occurrence of a pre-defined event; and
requesting the second search results in response to the detection of the pre-defined event.

3. The method of claim 2, wherein the pre-defined event comprises a scroll bar movement scrolling down the provided first search results page.

4. The method of claim 2, wherein the pre-defined event comprises a mouse-over a portion of the provided first search results page.

5. The method of claim 2, wherein the pre-defined event comprises receiving a request for the first set of search results.

6. The method of claim 1, further comprising:
receiving the indication of the request to display the second set of search results, wherein obtaining the pre-cached second search results page is in response to receiving the indication.

7. The method of claim 6, wherein the indication comprises a detection of user interaction associated with the request from the user for display of the second set of search results.

8. The method of claim 1, wherein the second search results page includes one or more advertisements and the confirmation confirms that the one or more advertisements were displayed to the user.

9. A system comprising:
one or more computers and one or more storage devices storing instructions that are operable, when executed by the one or more computers, to cause the one or more computers to perform operations comprising:
receiving, by a client device and from a search engine, a first search results page including a first set of search results;
after receiving the first search results page by the client device and before receiving an indication of a request from a user to display a second set of search results, providing, by the client device, the first search results page for display;
after providing the first search results page for display, requesting, by the client device, a second search results page including the second set of search results;
after requesting the second search results page including the second set of search results, receiving, by the client device, the second search results page;
pre-caching the received second search results page on the client device; and
after receiving the indication of the request, from the user, to display the second set of search results:
obtaining the pre-cached second search results page;
providing the obtained pre-cached second search result page for display; and
before receiving an indication of a request, from the user, to display a third set of search results, and in response to providing the obtained pre-cached second search result page for display, transmitting, by the client device, a confirmation, to the search engine, that the obtained pre-cached second search results page was displayed.

10. The system of claim 9, the operations further comprising:
detecting an occurrence of a pre-defined event; and
requesting the second search results in response to the detection of the pre-defined event.

11. The system of claim 10, wherein the pre-defined event comprises a scroll bar movement scrolling down the provided first search results page.

12. The system of claim 10, wherein the pre-defined event comprises a mouse-over a portion of the provided first search results page.

13. The system of claim 10, wherein the pre-defined event comprises receiving a request for the first set of search results.

14. The system of claim 9, the operations further comprising:
receiving the indication of the request to display the second set of search results, wherein obtaining the pre-cached second search results page is in response to receiving the indication.

15. The system of claim 14, wherein the indication comprises a detection of user interaction associated with the request from the user for display of the second set of search results.

16. The system of claim 9, wherein the second search results page includes one or more advertisements and the confirmation confirms that the one or more advertisements were displayed to the user.

17. A non-transitory computer-readable medium storing software comprising instructions executable by one or more computers which, upon such execution, cause the one or more computers to perform operations comprising:
receiving, by a client device and from a search engine, a first search results page including a first set of search results;
after receiving the first search results page by the client device and before receiving an indication of a request from a user to display a second set of search results, providing, by the client device, the first search results page for display;
after providing the first search results page for display, requesting, by the client device, a second search results page including the second set of search results;
after requesting the second search results page including the second set of search results, receiving, by the client device, the second search results page;
pre-caching the received second search results page on the client device; and
after receiving the indication of the request, from the user, to display the second set of search results:
obtaining the pre-cached second search results page;
providing the obtained pre-cached second search result page for display; and
before receiving an indication of a request, from the user, to display a third set of search results, and in response to providing the obtained pre-cached second search result page for display, transmitting, by the client device, a confirmation, to the search engine, that the obtained pre-cached second search results page was displayed.

18. The medium of claim 17, the operations further comprising:
detecting an occurrence of a pre-defined event; and
requesting the second search results in response to the detection of the pre-defined event.

19. The medium of claim 18, wherein the pre-defined event comprises a scroll bar movement scrolling down the provided first search results page.

20. The medium of claim 18, wherein the pre-defined event comprises a mouse-over a portion of the provided first search results page.

* * * * *